United States Patent
Leigh et al.

(10) Patent No.: US 10,488,604 B2
(45) Date of Patent: Nov. 26, 2019

(54) OPTICAL FERRULE ADAPTOR

(71) Applicant: HEWLETT PACKARD ENTERPRISE DEVELOPMENT LP, Houston, TX (US)

(72) Inventors: Kevin B. Leigh, Houston, TX (US); John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/717,512

(22) Filed: Sep. 27, 2017

(65) Prior Publication Data

US 2019/0094474 A1 Mar. 28, 2019

(51) Int. Cl.
| | |
|---|---|
| *G02B 6/38* | (2006.01) |
| *G06K 19/077* | (2006.01) |
| *G06F 16/955* | (2019.01) |
| *G06K 7/10* | (2006.01) |
| *H01Q 21/00* | (2006.01) |
| *H01Q 1/22* | (2006.01) |
| *H01Q 7/00* | (2006.01) |

(52) U.S. Cl.
CPC ........ *G02B 6/3895* (2013.01); *G02B 6/3825* (2013.01); *G02B 6/3879* (2013.01); *G06F 16/955* (2019.01); *G06K 7/10356* (2013.01); *G06K 19/07773* (2013.01); *H01Q 1/2216* (2013.01); *H01Q 7/00* (2013.01); *H01Q 21/0025* (2013.01)

(58) Field of Classification Search
None
See application file for complete search history.

(56) References Cited

U.S. PATENT DOCUMENTS

| | | |
|---|---|---|
| 8,068,715 B2 | 11/2011 | Kewitsch |
| 8,545,109 B2 | 10/2013 | Takiguchi |
| 9,140,869 B2 | 9/2015 | Julien et al. |
| 9,380,358 B2 | 6/2016 | Caveney |
| 9,645,328 B2 | 5/2017 | Cabessa et al. |
| 9,651,744 B2 | 5/2017 | Cabessa et al. |
| 2010/0079248 A1 | 4/2010 | Greveling |
| 2010/0098425 A1 | 4/2010 | Kewitsch |
| 2011/0274437 A1 | 11/2011 | Jones et al. |
| 2014/0016901 A1* | 1/2014 | Lambourn ........... G02B 6/3895 385/75 |
| 2016/0266330 A1 | 9/2016 | Zhang et al. |

OTHER PUBLICATIONS

Rehman, A. et al., "Optical Fiber Connector Surface Defect Detection Using Wavelets," (Research Paper), Int'l Conference on Information and Emerging Technologies, Jul. 6-7, 2007, 6 pages, http://ieeexplore.ieee.org/document/4381337/.

* cited by examiner

*Primary Examiner* — Michelle R Connelly
(74) *Attorney, Agent, or Firm* — Hewlett Packard Enterprise Patent Department

(57) ABSTRACT

An optical fiber assembly includes an optical ferrule adaptor and a tag reader assembly comprising a pair of tag reading antennas.

14 Claims, 6 Drawing Sheets

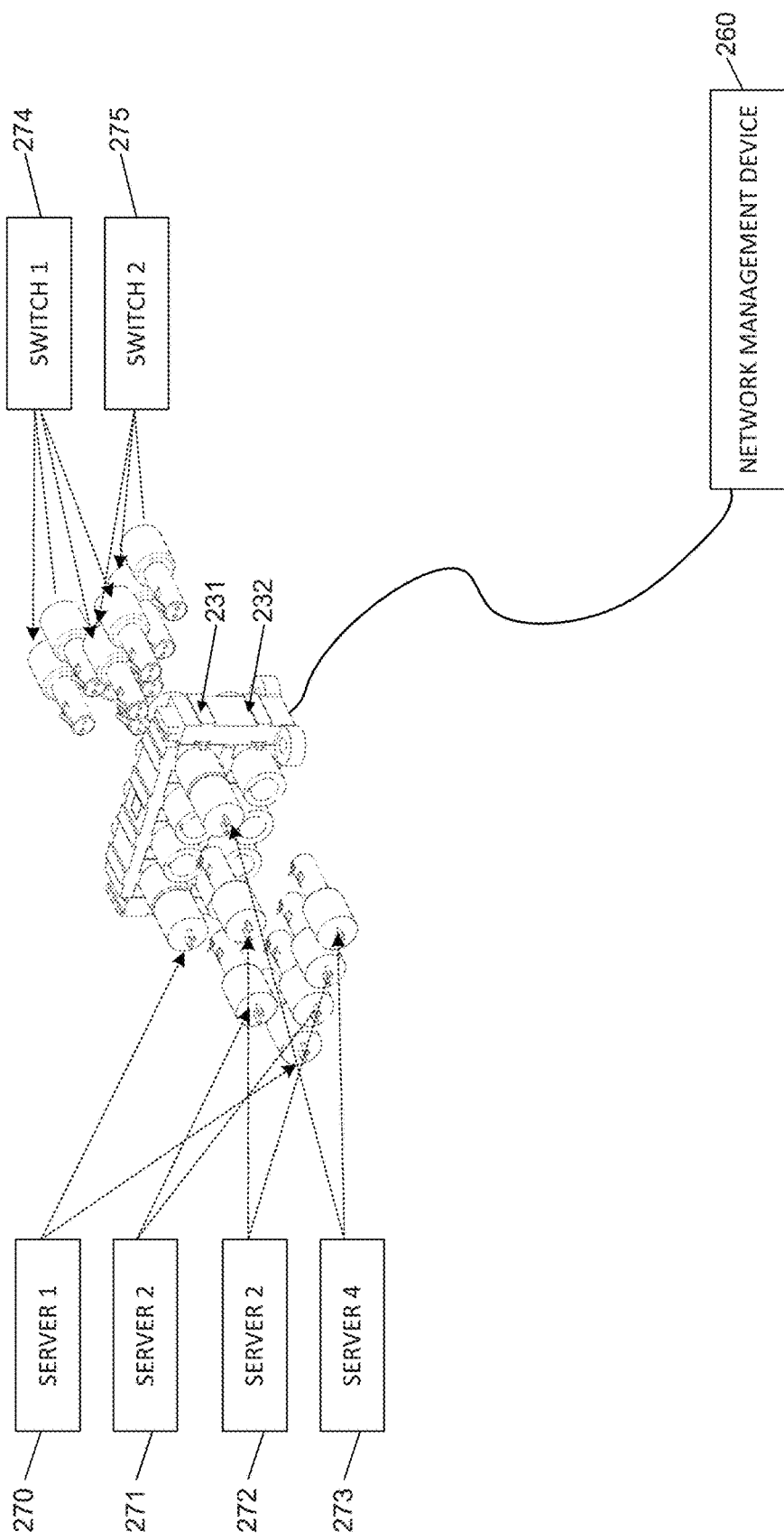

OPTICAL FERRULE ADAPTOR

BACKGROUND

Optical fiber shuffles are used to interconnect optical fibers to provide complex connectivity between computer or network systems. A patch panel provides pairwise connectivity between connectors, allowing a set of optical ports to be connected to another optical port to provide the desired connectivity.

BRIEF DESCRIPTION OF THE DRAWINGS

Certain examples are described in the following detailed description and in reference to the drawings, in which:

FIG. 2D illustrates an example where four servers are connected to two switches;

DETAILED DESCRIPTION OF SPECIFIC EXAMPLES

Some implementations of the disclosed technology provide optical ferrule adaptor assemblies that provide optical network connectivity auto-discovery. The optical fiber assemblies may be configured to provide a configurable number of adaptors in an array to provide a custom connectivity matrix.

Figure 1A:
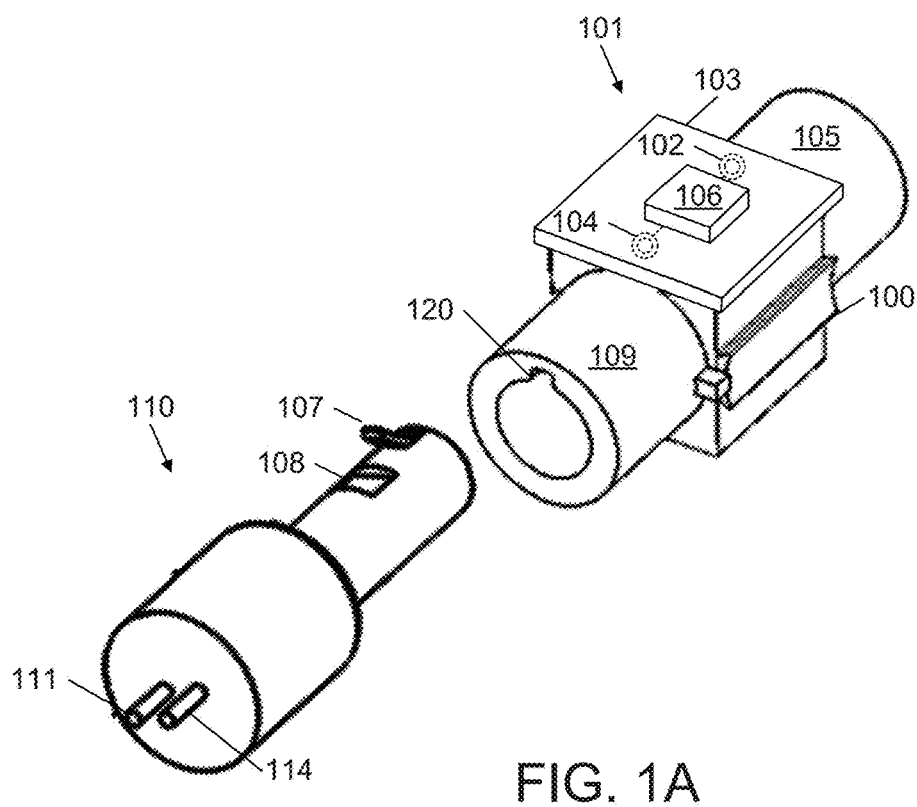
FIG. 1A illustrates an example optical ferrule adaptor assembly along with an optical fiber connector.
Figure 1B:
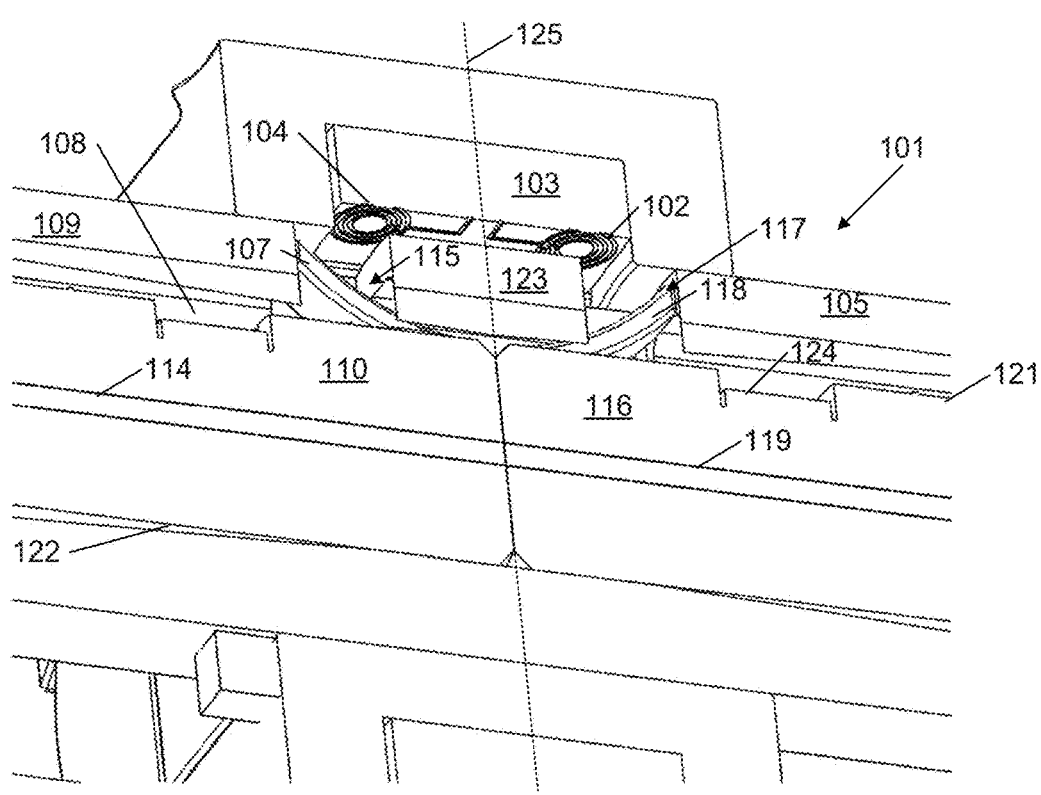
FIG. 1B illustrates a close-up cross-section of the connector mated with a second connector within the adaptor assembly.

FIG. 1A illustrates an example adaptor assembly 101 along with an optical fiber ferrule 110. FIG. 1B illustrates a close-up cross-section of the ferrule 110 mated with a second ferrule 116 within the adaptor assembly 101.

The adapter assembly 101 comprises an optical ferrule adaptor 100. The adaptor 100 comprises a first sleeve 109 to receive a first optical fiber ferrule 110. The adaptor 100 further comprises a second sleeve 105 to receive a second optical fiber ferrule 116 in a mating arrangement with the first ferrule 110. When the two ferrules 116, 110 are in the mating arrangement, the optical fibers 114, 119 of the respective ferrules are optically coupled allowing an optical signal to pass between them.

In the illustrated example, the sleeves 109 and 105 are cylindrical with a keyway 120 to accommodate a latch 107 on the ferrule 110 that orientates and retains the ferrule 110 within the sleeve 109. Both sleeves 109 and 105 have similar dimensions to allow a ferrule 110 to be inserted into either sleeve. The sleeves have sidewalls 122 with an internal draft such that the sleeves constrict towards the center line where the ferrules mate. The internal draft may ensure alignment between the ferrules 110, 116. In other examples, the sleeves may have other dimensions to accommodate other ferrule shapes, styles or other features to provide mating alignment.

The adapter assembly 101 further comprises a tag reader assembly 103 coupled to the adaptor 100. For example, the tag reader assembly 103 may be a radio frequency identification (RFID) tag reader. The tag reader assembly 103 comprises a first antenna 104 proximal to the first sleeve 109 and a second antenna 102 proximal to the second sleeve 105. Here, proximal means that the antennas 104, 102 are positioned sufficiently close to the sleeves 109, 105 to allow the reader to interrogate a tags 108, 124 disposed on optical ferrules 110, 116 when the ferrules 110, 116 are inserted into the sleeves 109, 105, respectively. In the illustrated example, the antennas 104, 102 are positioned adjacent their respective sleeves.

The tag reader assembly 103 further comprises a reader chip 106 connected to the antennas 104, 102 to interrogate tags 108, 124 disposed on the ferrules 110, 116. In the illustrated example, the antennas 104, 102 and reader chip 106 are configured to communicate with passive read-only or read-write RFID tags 108, 124. In other examples, the tags may be active RFID or near-field communication (NFC) tags, and the antennas 104, 102 and reader chip 106 are configured correspondingly.

In the illustrated example, each antenna 104, 102 is able to communicate only with tags on ferrules within the antenna's corresponding sleeve. For example, antenna 104 is able to interrogate only tags on ferrules inserted into sleeve 109. In some cases, the antenna's transmit power is configured to provide a sufficiently small range to prevent the antenna from reading a tag outside the sleeve.

Additionally, the antennas may be located to facilitate the single pairing. For example, in the illustrated example, each sleeve 109, 105 comprises a corresponding aperture 115, 117 to receive a ferrule latch 107, 118 to retain the ferrule 110, 116 within its sleeve 109, 105. In this example, the latches 107, 118 may be dimensioned such that they are flexed when inserted into the respective apertures 115, 117 to provide a force towards the centerline of the adaptor 110. For example, when only a single ferrule 110, 116 is inserted into an adaptor 100, the ferrule 110, 116 may extend slightly past the midplane 125 of the adaptor into the adjacent sleeve (e.g., latch 107 forces ferrule 110 into the center-most portion sleeve 105 if ferrule 116 has not been inserted into sleeve 105). This arrangement may facilitate positive mating force between the ferrules 110, 116 for good optical coupling between the ferrules' respective fibers 114, 119.

The antennas 104, 102 are aligned with the apertures 115, 117 such that at least a portion of the antenna 104, 102 is disposed over the aperture 115, 117. When a ferrule 110, 116 is inserted into a sleeve 109, 105, the ferrule's tag 108, 124 is proximal to the aperture 115, 117, facilitating communication between the tag 108, 124 and the antenna 104, 102. Additional components or configurations may be present to facilitate single pairing. For example, an RF attenuating material, such as a metal foil or metalized coating may be disposed on an inner or outer surface of a central portion 123 of the adaptor to prevent antenna 104 from pairing with a tag 124 on ferrule 116 and antenna 102 from pairing with tag 108 on ferrule 110.

In the illustrated example, each connector 110 comprises fiber bundle. In this example, the bundle comprises a pair of optical fibers 111 and 114 for full-duplex communication with a transmit fiber and a receive fiber. In other examples, the connector may have a single optical fiber 111. For example, pairs of such connectors may be used for full-duplex communication, or a single fiber may be used for half-duplex communication through time division, wavelength division, or other multiplexing techniques. In further examples, the bundles have more than two fibers.

Figures 2A, 2B:
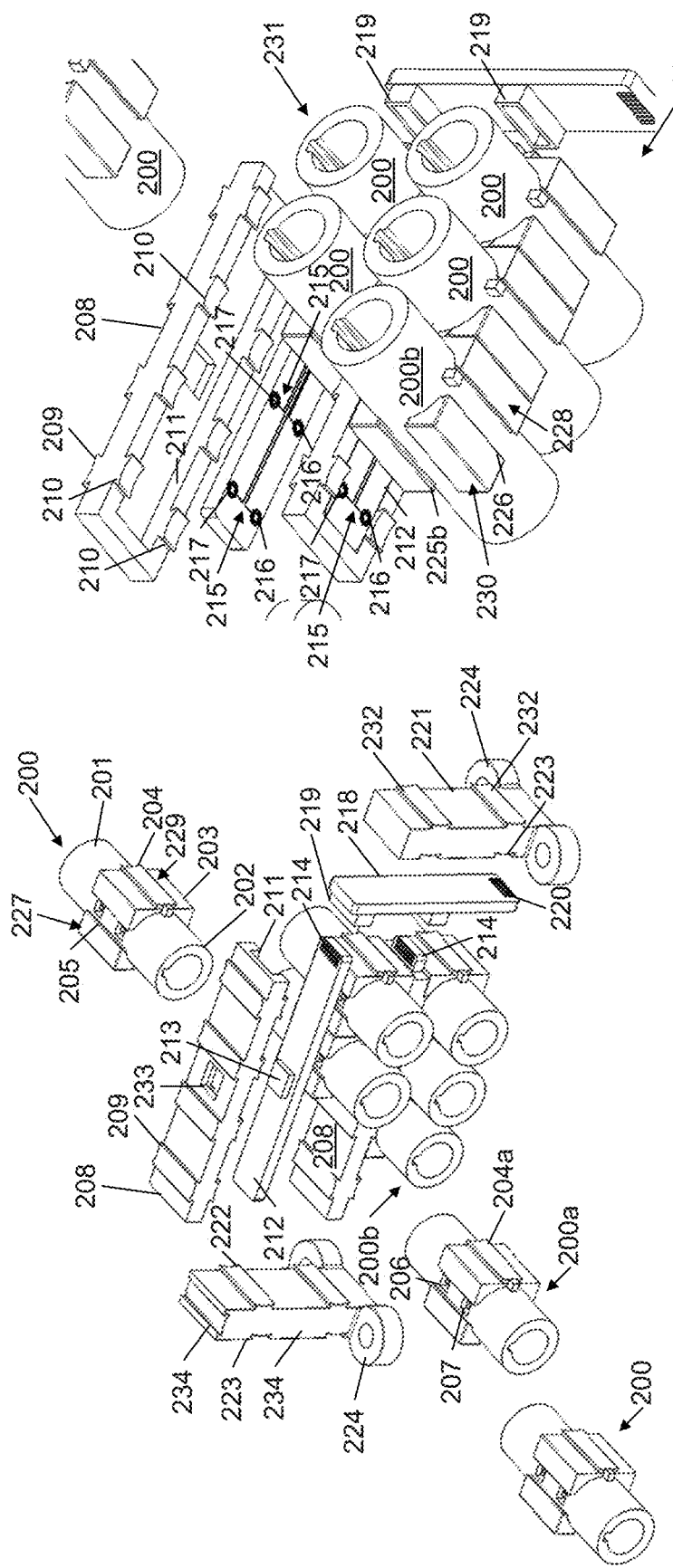
FIGS. 2A and 2B illustrate an example optical ferrule adaptor assembly comprising an array of adaptors.

FIGS. 2A and 2B illustrate an example optical ferrule adaptor assembly comprising an array of adaptor assemblies. The example assembly comprises a plurality of optical ferrule adaptors 200. The adaptors may be of the type described with respect to FIGS. 1A and 1B.

Each adaptor 200 comprises a plurality of mechanical connectors 204, 205, 225, 226 to allow manual connection between adaptors. For example, adaptor 200a may be connected to adaptor 200b by inserting mechanical connector 204a into mechanical connector 225b. In the illustrated example, each adaptor 200 comprises a pair of sleeves 201, 202 to receive corresponding ferrules. A central block 203 surrounds a central portion of each sleeve and the mechanical connectors 204, 205, 225, 226 are disposed on the block 203. In this example, the block 203 comprises a top face 227, a bottom face 228, a first side face 229, and a second side face 230. The mechanical connectors 204, 205, 225, 226 are implemented as interlocking members disposed on the faces 227, 228, 229, 230. Mechanical connector 204 is a dovetail projection while mechanical connector 225 is a slot shaped to receive the projection. Accordingly, adaptor 200a is connected to adaptor 225b by sliding dovetail 204a into slot 225b.

The example assembly further comprises a plurality of tag reader assemblies 212. Once assembled, each tag reader assembly 212 is coupled to a row 231, 232 of adaptors 200. Each of the tag reader assemblies 212 comprise a plurality of pairs 215 of antennas 216, 217, with one pair for each adaptor 200 on the corresponding row of adaptors 200. Each tag reader assembly 212 further comprises a reader chip 213 connected to the antennas. For example, the tag reader assemblies 212 may comprise circuit board assemblies with electrical conductors disposed on a circuit board to form the antennas 215 and to connect the antennas to a reader chip 213 mounted on the circuit board. Once assembled, each antenna is proximal to a particular sleeve of an adaptor. As described above, the antennas may be aligned with apertures 206, 207 in corresponding adaptor sleeves 201, 202.

The example assembly further comprises a plurality of retainers 208, with one retainer 208 for each tag reader assembly 212. A retainer 208 has a rectangular prism shape and comprises a receptacle 211 for the tag reader assembly 212. For example, the receptacle 211 may be an indentation into which the tag reader assembly 212 fits.

Additionally, the retainer comprises mechanical connectors 210 on its bottom face to couple with the row of optical ferrule adaptors 200 corresponding to the tag reader assembly 212 retained within its receptacle 211. The mechanical connectors 210 may comprise interlocking members that mate with top face 227 interlocking members 205 on the adaptors 200. In the illustrated example, the bottom mechanical connectors 210 are dovetails that slide into slots 205. Accordingly, the tag reader assembly 212 is retained by the retainer 208 by being sandwiched between the retainer 208 and the adaptors 200. In other example, each tag reader assembly 212 may be integral with the retainer 208.

In some implementations, the retainer 208 provides thermal management. For example, the retainer may be composed, at least partially, of a heat sink material, such as aluminum, or a thermally conductive aluminum alloy, copper or copper alloy, or a composite heatsink material. Additionally, the retainer 208 may comprise an aperture 233 aligned with the tag reader chip 213. For example, the aperture 233 may allow heat to escape from the tag reader chip 213 or to allow a thermal interface device to be attached to the chip 213. The thermal interface device may extract heat from the reader chip 213, and transfer the extracted heat to the retainer 208.

A retainer 208 further comprises a plurality of mechanical connectors 209 on its top face. The top mechanical connectors 209 may comprise interlocking members 209 that mate with interlocking members 209 on the bottom face 228 of the adaptors 200. For example, the top interlocking members 209 may be dovetails 209 that slide into corresponding slots 226 of the mechanical connectors. In further implementations, the lowest row 232 of the adaptor array may have a bottom retainer or similar structure that lacks a tag reader assembly but provides structural support to the adaptor array.

The tag reader assemblies 212 further comprise electrical connectors 214. The connectors 214 are used to provide power and a communication interface to the tag reader chips 213. The example assembly further comprises a connector array 218 comprising a plurality of electrical connectors 219 to mate with the electrical connectors 214. The connectors 219 comprise power connectors and communication interfaces for the tag reader assemblies 212. The connector array 218 further comprises an external connector 220 to allow the assembly to be powered and to communicate information read from ferrule tags to an external device, such as a network management device.

The example assembly further comprises a first support block 221 and a second support block 234. The first support block 221 comprises a receptacle to retain the connector array 218. For example, the receptacle may be an indentation as described with respect to receptacle 211. The first support block 221 further comprises mechanical connectors 223 on an inner face that connect to mechanical connectors 204 of the optical ferrule adaptors. For example, in an implementation where the mechanical connectors 204 are dovetails, the mechanical connectors 223 are sockets for the dovetails to slide into. The first support block 221 further comprises a second set of mechanical connectors 232 on an opposite face. The mechanical connectors 232 may be of the type that connects to the mechanical connectors 223. In the illustrated example, the mechanical connectors 232 are dovetails that fit into the slots 225 of the optical ferrule adaptors. In some implementations, the mechanical connectors 232 may be used to connect to a second array of optical ferrule adaptors, to allow greater customizability. Additionally, the mechanical connectors 232 may allow the first support block 221 and the second support block 232 to be used interchangeably. In further implementations, the opposite face mechanical connectors 232 may be omitted. The first support block 221 further comprises mounting members 224. For example, the members 224 may be rings to be retained by a fastening devices such as bolt or screw.

The second support block 234 comprises a set of mechanical connectors 222 on an inner face that connect to mechanical connectors 225 of the optical ferrule adaptors. For example, the mechanical connectors 225 may be interlocking members that interlock with corresponding interlocking members on the optical ferrule adaptors. For example, the mechanical connectors 225 may be dovetails that slide into slots 225. The illustrated example further includes a set of mechanical connectors 223 on an opposite face of the support block 234. The opposite face mechanical connectors 223 may of the same type as mechanical connectors 204 of the optical ferrule adaptors or mechanical connectors 232 of the first support block 221. For example, the mechanical connectors 223 may be used to connect a second array of adaptor assemblies or to allow the first support block 221 and the second support block 234 to be used interchangeably. The second support block 234 may further comprises a receptacle for a connector array 218. For example, where two optical ferrule adaptor arrays are to be connected using the support block 234, the receptacle may be used to retain the second connector array of the second adaptor array. As another example, the receptacle may allow the support block 234 to be used interchangeably with the first support block 221. The support blocks, 234 may further comprise mechanical connectors 235 disposed on the top face of the support blocks. The mechanical connectors 235 allow adaptor arrays to be stacked for increased customizability. For example, the mechanical connectors 235 may be interlocking members similar to mechanical connectors 209 of the retainer s 208.

Figure 2C:
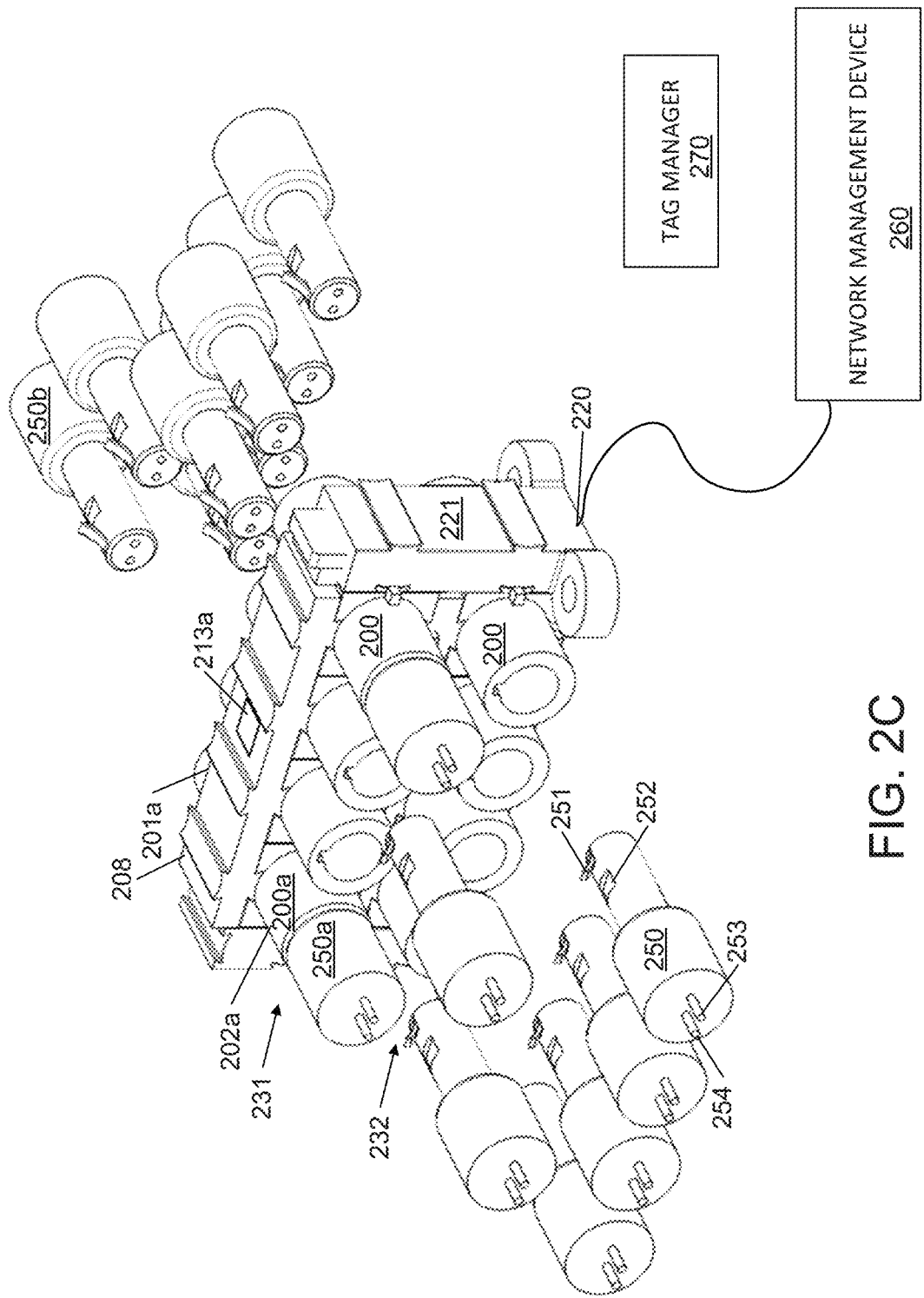
FIG. 2C illustrates an example system including an assembly as illustrated in FIGS. 2A and 2B.

FIG. 2C illustrates an example system including an assembly as illustrated in FIGS. 2A and 2B, a set of optical fiber ferrules 250, and a network management device 260.

The illustrated system includes an optical fiber ferrule 250 for each sleeve of the array of adaptors 200. Each ferrule 250 may be as described with respect to ferrules 110, 116 of FIG. 1. For example, each ferrule 250 may include a latch 251, a radio frequency identification (RFID) tag 252, and optical fibers 254, 253. The tags 252 may be used to store network identifiers (IDs) corresponding to the devices connected to the optical fibers. For example, the network IDs may be optical port IDs corresponding to the device's optical port to which the ferrules are connected. For example, a network administrator may program the tags 252 while setting up the system. As another example, the network IDs may be unique serial numbers that are pre-programmed into the tags 252. In this example, a lookup table or other association may be created to map each connector's serial number to its attached network location. For example, a lookup table associated the serial numbers to connected port identifiers may be generated during system setup.

The example system further includes a tag manager 270. The tag manager may be used to program the network IDs and other information onto the RFID tags 252 via tag reader chip 213 (described further in [0035]). For example, the tag manager 270 may be a handheld device, which may be used during system set up to read and program tags 252 as their corresponding fibers are connected to their corresponding computer or network devices. As another example, the tag manager 270 may be integrated into the network management device 260 or a plurality of tag managers 270 may be integrated into the connected devices.

The network management device 260 may be any of various management devices, such as a rack or chassis management module, a management controller within a server or network devise such as a switch, a standalone network management device, or a server or other computer running network administration software. The network management device 260 is coupled to the reader chip 213 via the interface 220. The device 260 may receive the network IDs stored on the tag 252 from the reader chip 213 and may use this information to determine network connectivity. The device 260 may determine pairwise connectivity between devices by determining which network endpoints are connected. Accordingly, IT personnel may achieve a desired topology by connecting devices through the adaptor array without regard to specific port to port mappings, allowing the port-to-port mapping to be automatically discovered by the device 260.

Additionally, in some examples, the tags 252 may be a read-write type where the reader chip 213 may be a reader/writer chip. The tag reader/writer chip may write information on the tags 252 using the same antennas that are used to read the tags 252. In these examples, the network management device 260 may use the tag reader/writer chips 213 to write information such as in which sleeve a ferrule was installed, the installation date, the network ID of the mated ferrule, etc. Additional information such as data link settings (including equalization filter settings) and optical transceiver performance statuses (including bit error rates) may also be written on the tags 252.

FIG. 2D illustrates an example where four servers 270, 271, 272, 273, with dual full-duplex optical ports are connected to four ports of two switches 274, 275 by plugging one fiber pair from each computer optical port into the top row 231 and one fiber pair into the bottom row 232 of the front face of the adaptor, and plugging one fiber pair from each of the four switch ports of the first switch to the top row 231 and one fiber pair from each of four switch ports of the second switch to the bottom row 232. The specific port-to-port mappings may then be determined by the network management device 260. For example (see FIG. 2C), if port 1 of computer 1 270 is connected to ferrule 250a, and port 3 of switch 1 274 is connected to ferrule 250b, this connectivity is determined by interrogating the tags of ferrule 250a and 250b using tag reader chip 213a. Accordingly, personnel are free from having to track specific port to port connectivity, reducing mistaken connections and simplifying installation.

Figure 3:
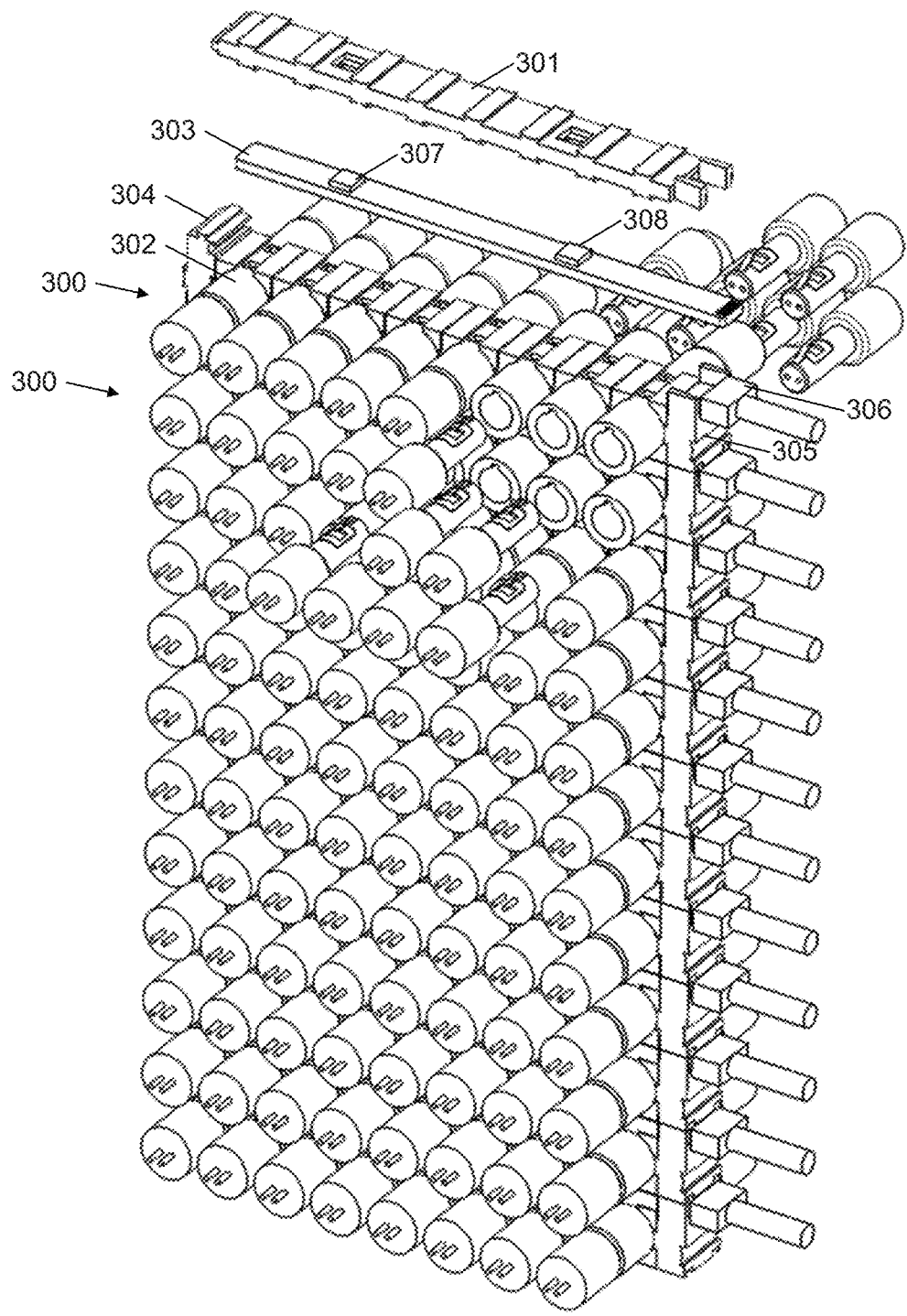
FIG. 3 illustrates an exploded view another optical ferrule adaptor array with connected ferrules.

FIG. 3 illustrates an exploded view another optical ferrule adaptor array with connected ferrules. Although illustrated as a 4×2 array in FIGS. 2A-2C, any M×N array may be supported. For example, FIG. 3 illustrates twelve eight-adaptor rows stacked to form an 8×12 array. In this implementation, each row 300 is an assembly comprising a retainer 301, a plurality of optical ferrule adaptors, a tag reader assembly 303, a pair of support blocks 304, 305, and a management interface 306.

Here, each tag reader assembly 303 comprises a pair of reader chips 307, 308. The number of chips 307, 308 may be determined according to how many antennas each circuit is able to drive. For example, in the illustrated implementation, each chip 307, 308 is able to drive eight antennas, so two circuits are used for the 16 total antennas of the row 300.

Additionally, unlike FIGS. 2A-2C, each of the row array comprises a separate management interface 306 to connect to a network management device (not shown). In some implementations, the interfaces 306 may be wired or wireless communication interfaces. Additionally, the interfaces may be daisy chained to form a bus or other interconnect with a single connection to a management device. Alternatively, a connector array as described in FIG. 2B may be employed to provide a single interface or a reduced number of interfaces to the management device.

Figure 4:
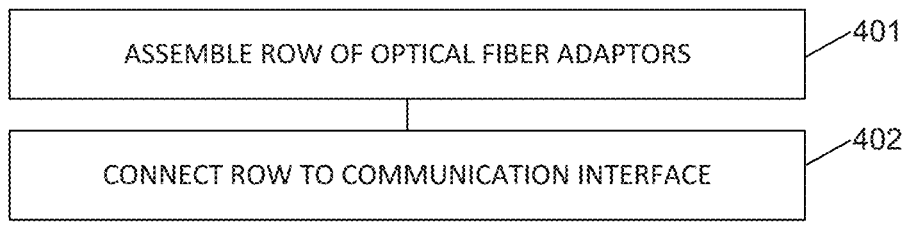
FIG. 4 illustrates a method of assembling an optical ferrule adaptor array.

FIG. 4 illustrates a method of assembling an optical ferrule adaptor array.

The method includes block 401. Block 401 includes assembling a row of optical ferrule adaptors by attaching a plurality of optical ferrule adaptors to a retainer. Each optical ferrule adaptor may be as described with respect to FIGS. 1-3. For example, each adaptor may include a first sleeve to receive a first optical fiber ferrule, and a second sleeve to receive a second optical fiber ferrule in a mating arrangement with the first optical fiber ferrule. The retainer may include a chip reader and a plurality of antennas, each antenna corresponding to a single sleeve of the plurality of optical ferrule adaptors.

The method further includes block 402. Block 204 includes connecting the row of optical ferrule adaptors to a communication interface. For example block 402 may include connecting a tag reader assembly to a connector array or by connecting the adaptors to a tag reader assembly comprising a built-in communication interface.

Figure 5:
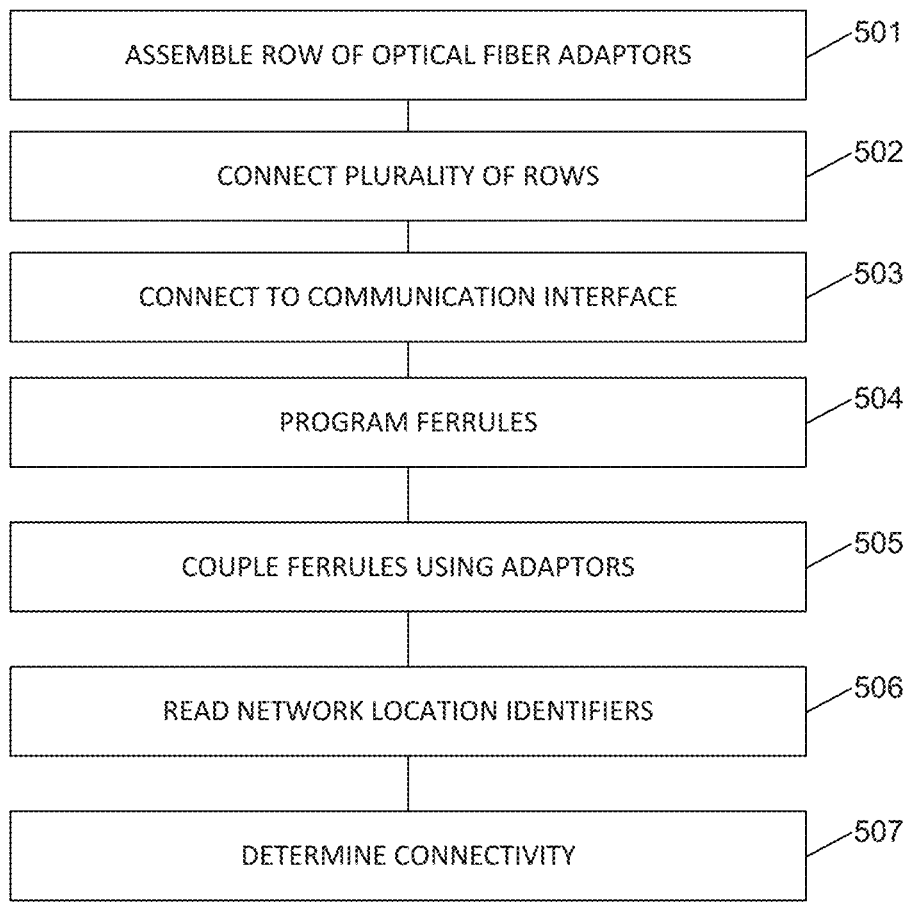
FIG. 5 illustrates an example method of assembling an optical ferrule adaptor array and determining the connectivity between devices attached using the array.

FIG. 5 illustrates an example method of assembling an optical ferrule adaptor array and determining the connectivity between devices attached using the array.

The method includes block 501. Block 501 includes assembling a row of optical ferrule adaptors, and may be performed as described with respect to block 401 of FIG. 4.

The method further includes block 502. Block 502 includes connecting a plurality of rows of optical ferrule adaptors. For example, block 502 may be performed by interlocking supports blocks and interlocking the bottom of rows of adaptors to top interlocking members of retainer members.

The method further includes block 503. Block 503 includes connecting the array to a communication interface. For example, block 503 may be performed as described with respect to block 402 of FIG. 4.

The method further includes block 504. Block 504 includes programming optical fiber ferrules with network location identifiers corresponding to attached devices. For example, one a fiber bundle is connected to an optical port of a device, the end of the bundle may be terminated in ferrule comprising an RFID tag. The tag may be programmed with the network location identifier, such as a port ID, using a handheld tag writer or a tag writer attached to the device.

The method further includes block 505. Block 505 includes coupling pairs of the plurality of optical fiber ferrules using the optical ferrule adaptors. For example, block 505 may comprise inserting each ferrule into a sleeve of an optical ferrule adaptor.

The method further include block 506. Block 506 includes reading the network location identifiers using the chip reader. For example, block 506 may be performed using a network management device connected to the chip readers of the optical ferrule adaptor array. For example, block 506 may be performed using the management device 260 described herein.

The method further includes block 507. Block 507 includes determining connectivity between the attached devices using the read network locations. For example, block 507 may be performed by the management device 260. As another example, the management device 206 may transmit the information to another component of a network management system, which may perform block 507. The determined connectivity may then be used during operation. For example, the information may be used to update mapping tables within the connected devices to allow desired operation.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. An optical ferrule adaptor assembly, comprising:
an optical ferrule adaptor comprising:
a first sleeve to receive a first optical fiber ferrule, and
a second sleeve to receive a second optical fiber ferrule in a mating arrangement with the first optical fiber ferrule;
a tag reader assembly coupled to the optical ferrule adaptor, and comprising:
a first antenna proximal to the first sleeve,
a second antenna proximal to the second sleeve, and
a reader chip connected to the first and second antennas;
a retainer coupled to the tag reader assembly and the optical ferrule adaptor, the retainer comprising a receptacle for the tag reader assembly and a mechanical connector to couple with the optical ferrule adaptor; and
a third optical ferrule adaptor comprising a third sleeve to receive a third optical fiber ferrule, and a fourth sleeve to receive a fourth optical fiber ferrule in a mating arrangement with the third optical fiber ferrule;
a second tag reader assembly coupled to the second optical ferrule adaptor, and comprising:
a third antenna proximal to the third sleeve,
a fourth antenna proximal to the fourth sleeve, and
a second reader chip connected to the third and fourth antennas; and
a second retaining member coupled to a bottom portion of the first optical ferrule adaptor, and to a top portion of the second optical ferrule adaptor, and comprising a second receptacle for the second tag reader assembly.

2. The assembly of claim 1, further comprising:
a second optical ferrule adaptor comprising:
a third sleeve to receive a third optical fiber ferrule, and
a fourth sleeve to receive a fourth optical fiber ferrule in a mating arrangement with the third optical fiber ferrule; and
wherein the tag reader assembly further comprises:
a third antenna proximal to the third sleeve and connected to the reader chip, and
a fourth antenna proximal to the fourth sleeve and connected to the reader chip.

3. The assembly of claim 2, wherein the first optical ferrule adaptor comprises a first mechanical connector and the second optical ferrule adaptor comprises a second mechanical connector to allow manual connection of the first optical ferrule adaptor to the second optical ferrule adaptor.

4. The assembly of claim 2, further comprising a circuit board assembly coupled to the first and second optical ferrule adaptors, the circuit board assembly comprising the tag reader assembly and the first, second, third, and fourth antennas.

5. The assembly of claim 4, further comprising a connector array comprising power connectors and communication interfaces for a plurality of circuit board assemblies, the circuit board assembly being one of the plurality.

6. The assembly of claim 1, wherein the optical ferrule adaptor comprises:
a first aperture in the first sleeve aligned with the first antenna; and
a second aperture in the second sleeve aligned with the second antenna.

7. The assembly of claim 1, further comprising a row of optical ferrule adaptors, the row including the first optical ferrule adaptor, each optical ferrule adaptor of the row comprising a pair of sleeves, and wherein the tag reader assembly further comprises an antenna for each sleeve, each antenna connected to the reader chip and proximal to a corresponding sleeve.

8. A system, comprising:
a first optical fiber ferrule comprising a first radio frequency identification (RFID) tag, the first RFID tag storing a first network identifier;
a second optical fiber ferrule comprising a second (RFID) tag storing a second network identifier;
an optical ferrule adaptor comprising:
   a first sleeve to receive the first optical fiber ferrule, and
   a second sleeve to receive the second optical fiber ferrule in a mating arrangement with the first optical fiber ferrule;
a tag reader assembly coupled to the optical ferrule adaptor, and comprising:
   a first antenna proximal to the first sleeve,
   a second antenna proximal to the second sleeve, and
   a reader chip connected to the first and second antennas;
a network management device connected to the reader chip to receive the first network identifier and the second network identifier from the tag reader assembly and to determine network connectivity using the first and second identifiers; and
a row of optical ferrule adaptors, the optical ferrule adaptor being one of the row; and
a retainer comprising a plurality of bottom interlocking members mated with the top interlocking members of the optical ferrule adaptors of the row of optical ferrule adaptors, and wherein the tag reader assembly is disposed within an indentation of the retainer; wherein the tag reader assembly comprises:
   a plurality of pairs of antennas, each pair corresponding to an optical ferrule adaptor of the row; and
   a communication interface to connect to the network management device; and
wherein each optical ferrule adaptor comprises a top face having a top interlocking member, a bottom face having a bottom interlocking member, a first side face having a first side face interlocking member, and a second side face having a second side interlocking member.

9. The system of claim 8, further comprising:
a second row of optical ferrule adaptors; and
a second retainer, comprising a plurality of top interlocking members mated with the bottom interlocking members of the first row of optical ferrule adaptors, and a plurality of bottom interlocking members mated with corresponding top interlocking members of the second row of optical ferrule adaptors.

10. The system of claim 9, further comprising:
a second tag reader assembly disposed within an indentation of the second retainer, the second tag reader assembly comprising a plurality of pairs of antennas, each pair corresponding to one of the second row of optical ferrule adaptors.

11. The system of claim 10, further comprising:
a first support block mated to a first optical ferrule adaptor of the first row;
a second support block mated to a second optical ferrule adaptor of the first row;
a third support block mated to the first support block and a first optical ferrule adaptor of the second row; and
a fourth support block mated to the second support block and a second optical ferrule adaptor of the second row.

12. The system of claim 8, further comprising a support block comprising a socket holding the retainer, and a support interlocking member mated with the first side interlocking member of one of the optical ferrule adaptors of the row of optical ferrule adaptors.

13. The system of claim 8, wherein the retainer comprises a heat sink material.

14. The system of claim 8, wherein the reader chip is a reader/writer chip and wherein the network management device is further to use the reader/writer chip to write information to the first RFID tag or the second RFID tag.

* * * * *